| United States Patent [19] | [11] Patent Number: 5,030,600 |
| Hida et al. | [45] Date of Patent: Jul. 9, 1991 |

[54] NOVEL SIALON COMPOSITION

[75] Inventors: George T. Hida; Rodica S. Hida, both of Amherst, N.Y.

[73] Assignee: Benchmark Structural Ceramics Corp., Amherst, N.Y.

[21] Appl. No.: 535,035

[22] Filed: Jun. 7, 1990

Related U.S. Application Data

[63] Continuation-in-part of Ser. No. 365,606, Jun. 13, 1989, abandoned, and a continuation-in-part of Ser. No. 364,014, Jun. 9, 1989, abandoned, and a continuation-in-part of Ser. No. 339,137, Apr. 14, 1989, Pat. No. 4,957,885, and a continuation-in-part of Ser. No. 254,175, Oct. 6, 1988.

[51] Int. Cl.$^5$ .............................................. C04B 35/58
[52] U.S. Cl. ........................................ 501/98; 423/327
[58] Field of Search ................... 501/98; 423/327, 328

[56] References Cited

U.S. PATENT DOCUMENTS

| 4,360,506 | 11/1982 | Paris et al. | 423/237 |
| 4,812,298 | 3/1989 | Kohtoku et al. | 501/98 |
| 4,845,061 | 7/1989 | Inoguchi et al. | 501/98 |

*Primary Examiner*—William R. Dixon, Jr.
*Assistant Examiner*—Deborah Jones
*Attorney, Agent, or Firm*—Howard J. Greenwald

[57] ABSTRACT

A novel composite mateial consisting of at least 70 weight percent of single-phase beta sialon and at least 20 weight percent of alpha-alumina is disclosed. The beta-sialon is of the formula $Si_{6-z}Al_zN_{8-z}$, wherein z is from 2.5 to 3.5. The composite material contains no silicon nitride. Sintered products made from such composite material contain no glassy phase, contain no silicon nitride, and have superior thermal and mechanical properties.

3 Claims, 1 Drawing Sheet

NOVEL SIALON COMPOSITION

CROSS REFERENCE TO RELATED APPLICATION

This is a continuation-in-part of copending applications U.S. Ser. No. 07/365,606 (filed June 13, 1989) now abandoned, U.S. Ser. No. 07/364,014 (filed June 9, 1989) now abandoned, U.S. Ser. No. 339,137 (filed Apr. 14, 1989) now U.S. Pat. No. 4,957,885 and U.S. Ser. No. 254,175 (filed Oct. 6, 1988).

FIELD OF THE INVENTION

A composite material comprised of single-phase sialon and single-phase alpha-alumina is disclosed. The material can be formed into green bodies which, after being debindered, can be heated to form dense ceramic objects.

BACKGROUND OF THE INVENTION

Refractory Bodies

It is known that a refractory body must possess the ability to stand up under exposure to high temperatures without undue chemical or physical change, to resist sudden changes in temperature without cracking or manifesting other evidence of body breakdown, to possess a relatively high mechanical strength at room temperatures and to maintain such strength at elevated temperatures, to resist various erosive and chemical, oxidative, and/or corrosive environments, and to possess a density and hardness suitable for the use to which the refractory body is to be put.

In order to obtain a high degree of perfection in respect to one or more of the above properties, it has usually been found necessary to forego the benefits of maximum performance in respect of certain other desirable properties. Thus, by way of example, the prior art has taught that, in order to obtain high-density beta-sialon compositions, one must use sintering aids which form a glass phase liquid at the sintering temperature. However, the use of such sintering aids tends to degrade the mechanical properties of the sintered product, often lowering the refractoriness. Thus, e.g., as is disclosed in P. Ferguson et al.'s "Sialons for Engineering and Refractory Applications" (Ceramic Engineering and Science Proceedings, Volume 6, No. 9–10, September–October, 1985, The American Ceramic Society, Westerville, Ohio), " . . . two major groups of Syalon ceramics are manufactured in which the intergranular phase composition and structure is controlled by the variation in the level of additions in the starting mix. Materials can be formed with a microstructure containing beta-prime-Syalon grains bonded a continuous, glassy second phase. The presence of the glassy phase limits the upper operating temperature range for such materials to around 800 degrees centigrade." (see page 1297).

Various refractory compositions especially suitable for one field of use are often found to be entirely unsatisfactory for other purposes. There is, thus, a continual demand for refractory bodies of new composition which will meet those demands of a special nature which require a combination of properties not to be found in those compositons of a refractory type already available.

Beta-Sialon

"Sialons" are phases in the silicon—aluminum—oxygen—nitrogen and related systems comparable in variety and diversity with the mineral aluminosilicates. They contain one-, two-, and three-dimensional arrangements of silicon oxide tetrahedra in which silicon and oxygen atoms are partially replaced by aluminum and nitrogen. See, e.g., K. H. Jack's "Sialons and related nitrogen ceramics," Journal of Materials Science 11 (1976), 1135–1158.

One well-known class of sialons is the beta-sialons, which have the formula $Si_{6-z}Al_zO_zN_{8-z}$ (I), wherein z is from 0 to 4.2. See, e.g., the aforementioned article by K. H. Jack. Also see "Engineering Property Data on Selected Ceramics" (Battelle Memorial Institute, Metals and Ceramics Information Center, Columbus Division, Columbus, Ohio, 43201, March 1976, republished in July of 1987). Thus, for example, U.S. Pat. No. 3,991,148 of Lumby et al. discloses a beta-sialon with the aforementioned formula wherein z is 3.3 (see column 2, lines 15–33).

A beta-sialon composition in which z is 3.0 is disclosed in an article by P. Ferguson et al. entitled "Sialon and Syalon Powders: Production, Properties and Applications." The authors disclose that such a composition was sold as "Syalon 401" by the Lucas Cookson Syalon Limited Company of the United Kingdom. At page 100 of the article, the authors disclose that the thermal shock resistance of this syalon material is about 900 degrees centigrade.

The Thermal Shock Resistance of Prior Art Beta-Syalon

Sialon-based ceramics made with yttria sintering aids are described in the aforementioned P. Ferguson article which was published by the American Ceramic Society. These materials were prepared by a method involving mixing silicon nitride powder with alumina, sialon-polytype, and yttrium oxide; and, because of the use of the yttria as a liquid-phase-sintering aid, they were referred to as "syalons." The properties of these "syalons" were summarized in Table I, appearing at page 1301 of the article. According to this Table, the thermal shock resistance of these materials was 900 degrees centigrade.

Sinterability of Prior Art Sialon Compositions

The use of sintering aids, such as yttria, was required with prior art syalon compositions in order to make fired bodies with complicated shapes. However, the use of these aids degraded the physical and thermal properties of the sintered body.

Because the prior art sialons had a relatively low shrinkage, on the order of about ten percent, the use of the sintering aids which formed a glassy phase liquid at the sintering temperature was required to fill the interstices of the material during sintering.

The Presence of Silicon Nitride in the Sialon Composition

To the best of applicants' knowledge, all of the prior art sialon compositions contained silicon nitride. Because it has a low diffusion coefficient at the sintering temperature, the prior art compositions sintered sialon exhibited density gradients and nonuniformity. Although the use of the liquid-phase sintering aids allowed one to obtain relatively high-density products, they did not necessarily improve the uniformity of the fired products; and they tended to degrade the properties of such products.

The Effect of the Z Value in the Beta-Sialon Formula

There is a substantial amount of prior art indicating that the z value in the aforementioned formula I for beta-sialon should be relatively low.

U.S. Pat. No. 4,127,416 of Lumby et al., which describes a process for producing a single-phase beta-sialon of formula I, discloses that the z value in the formula I) must be from 0.38 to 1.5. At column 2, Lumby et al. teach that ". . . the relative proportions of the compounds present . . . are arranged so as to produce the ceramic material . . . where z is between 0.38 and 1.5, since having the z value within these limits is found to produce a coherent product having a high strength even when the sintering is performed in the absence of pressure. If, on the other hand, the z value is allowed to fall below 0.38, the material becomes difficult to sinter without the application of pressure, while the strength of the product deteriorates if the z value is allowed to increase above 1.5." Similar teachings may be found in U.S. Pat. Nos. 4,711,644 of Yeckley et al. (see column 3) and 4,506,020 of Butler et al. (see column 1).

U.S. Pat. No. 4,147,759 of Demit discloses that, with regard to beta-sialon of formula I, no prior art method had ". . . succeeded in . . . obtaining a single phase product with low porosity and which is crystallographically pure." The process of Demit did succeed in obtaining a beta-sialon with a porosity of less than about 1.0 percent; the sialon used in his process had a z value of 2.8 or less.

The Amount of Alumina in the Sialon Composition

U.S. Pat. No. 4,500,644 of Winkelbauer et al. discloses a sialon composition containing free alumina and silicon nitride. However Winkelbauer et al. teach that such free alumina is a contaminant (see the abstract) and, thus, ". . . it is the intention of this invention to keep the free alumina in content in the sialon briquette at a minimum . . ." (see column 2).

U.S. Pat. No. 4,522,711 of Raj et al. discloses that, in the sintering of nitrogen-based materials (such as sialon), ". . . the attainment of maximum densities has been thwarted by a vaporization or volatilization phenomenon since apparently nitrogen or other off gas is formed during the densification process, preventing maximum densification . . ." (see lines 47–53 of column 1). Raj et al. suggest that one may use a maximum of up to about 7 percent of a "liquid phase producing bonding adjuvant" such as, e.g., alumina.

Pressureless-Sintering of Beta-Sialon Compositions

It is known that a composition which can be sintered without the use of high pressure will allow to produce sintered bodies of complex shape. However, the prior art teaches that one may not use pressureless sintering to form beta-sialon into high-density shaped objects without the use of sintering aids. The use of these aids, however, degrades the mechanical and thermal properties of the sintered body.

Thus, U.S. Pat. No. 4,365,022 of Tabata et al. discloses that one may obtain a sintered beta-sialon composition with the use of a mixture of beryllia/gallia, beryllia/alumina, or alumina/gallia sintering aids. The patent discloses a "Comparative Experiment 2" in which a sialon which did did contain one of said sintering aids was sintered. It is disclosed at column 9 of the patent that, with regard to this Comparative Experiment, ". . . the product . . . acquired a lower density and exhibited a lower bending strength than the product containing such additive components." At column 8 of this patent, it is disclosed that the sialon composition obtained in this Comparative Experiment contained beta-sialon, alpha-alumina, and an unknown glassy phase.

It is an object of this invention to provide a beta-sialon composition which does not contain silicon nitride.

It is another object of this invention to provide a sintered material comprised of at least 70 weight percent of beta-sialon which does not contain a glassy phase.

It is an object of this invention to provide a beta-sialon composition which can be sintered without pressure into a high-density body which possesses superior mechanical and thermal properties.

It is another object of this invention to provide a beta-sialon composition which can be sintered without the use of a sintering aid into a high-density body which possesses good mechanical and thermal properties.

It is another object of this invention to provide a beta-sialon composition in which at least about 20 percent of the beta-sialon has a whisker and/or platelet morphology.

It is another object of this invention to provide a beta-sialon whisker composition which can be sintered without pressure and without the use of sintering aids.

It is another object of this invention to provide a pellet which can be used to produce the beta sialon compositions of this invention.

It is another object of this invention to provide a beta-sialon composition which is reinforced with whiskers selected from the group consisting of silicon carbide, titanium carbide, and titanium nitride whiskers.

It is another object of this invention to provide primarily synthesized beta-sialon composition.

It is yet another object of this invention to provide a process to prepare primarily synthesized silicon-aluminium-oxygen-nitrogen ceramic material.

It is yet another object of this invention to provide a self-sustaining, highly-exothermic "SHS" process for the production of said composite material at a cost substantially less than that presently incurred for the preparation of the prior art "sialon" materials.

SUMMARY OF THE INVENTION

In accordance with this invention, there is provided a composite material consisting of at least two phases selected from the group consisting of single-phase beta-sialon, single phase alumina, and single-phase silicon oxynitride.

The single phase beta-sialon in said composition is of the formula $Si_{6-z}Al_zO_zN_{8-z}$, wherein z is from about 2.5 to about 3.5. The composition contains at least about 70 weight percent of such beta-sialon, at least about 20 weight percent of alpha-alumina, and no silicon nitride.

The composite material of this invention, after pressureless sintering, contains no glassy phase, contains no silicon nitride, has an elastic modulus of from about 300 to about 650 GigaPascals, a flexural strength of from about 300 to about 900 megaPascals, a wear resistance of from about 24 to about 20, a porosity of less than about 2 percent, and a density of at least 98 percent of its theoretical density.

DESCRIPTION OF THE DRAWING

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
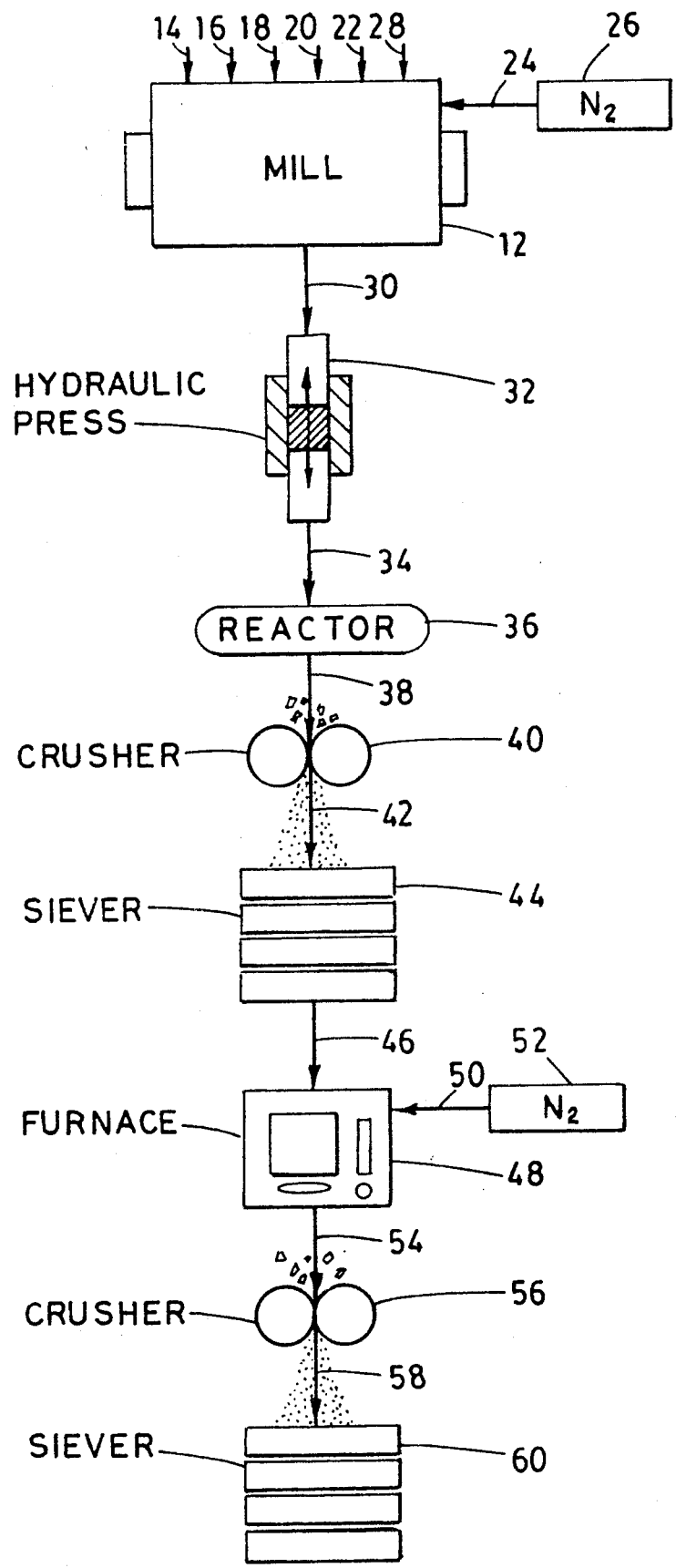
FIG. 1 is a flow sheet of a preferred embodiment of the process of this invention.

The composition produced by the process of this invention is primarily synthesized. The term "primarily synthesized," as used in this specification, refers to a composition created entirely from elements, as opposed to a composition obtained by the modification of an existing structure. Applicant believes that, because of the primary synthesis of his material, it contains a structure which is substantially different than the structure of the prior art "Sialon."

The unsintered composition of this invention, because it is primarily synthesized, does not contain any silicon nitride.

The composition of this invention is a composite material. The term composite material, as used in this specification, refers to a material which contains more than one phase.

As used in this specification, the term "phase" refers to a separate, but homogeneously dispersed, fraction of a system. The use of a scanning electron microscope to determine the number of phases in a ceramic material is well known to those skilled in the art. See, e.g., pages 443–456 of Volume 8 of the "McGraw-Hill Encyclopedia of Science & Technology," supra; C. W. Oatley, W. C. Nixon, and R. F. W. Pease, "Scanning electron microscopy, Advances in Electronics and Electron Physics," vol. 21, 1965; and pages 132–136 of J. T. Jones and M. F. Berard's "Ceramics: Industrial Processing and Testing," (The Iowa State University Press, Ames, Iowa, 1972). The disclosure of each of these documents is hereby incorporated by reference into this specification.

The composite material of this invention is comprised of at least two phases, and it contains at least one beta-sialon phase, and one alpha-alumina phase. In one embodiment, the composite material of this invention is comprised of at least three phases. The phases in said composite material are preferably selected from the group consisting of single-phase beta-sialon with the formula I described above, single-phase alpha-alumina, and single phase silicon oxynitride.

The composite material of this invention comprises at least about 70 weight percent of said single-phase beta sialon, of formula I, wherein z is from about 2.5 to about 3.5. It is preferred that the composite material comprise at least about 75 weight percent of said single-phase beta sialon, that z be from about 2.7 to about 3.3. It is more preferred that z be from about 2.9 to about 3.1. In one preferred embodiment, z is about 3.0.

The composite material of this invention contains no silicon nitride.

The presence and amount of the beta-sialon, the alpha-alumina, the silicon oxynitride, and the silicon nitride in applicants' compositions may be determined by convention X-ray diffraction analysis. As is known to those skilled in the art, X-ray-diffraction is a method of spectroscopic analysis involving the reflection or scattering of X-radiation by the atoms of a substance (lattice) as the rays pass through it. This technique is described, e.g., on pages 649–656 of Volume 14 of the McGraw-Hill Encyclopedia of Science & Technology (McGraw-Hill Book Company, New York, 1977), the disclosure of which is hereby incorporated by reference into this specification.

Thus, by way of illustration, X-ray diffraction ("XRD") analysis may be conducted on a Siemens D-500 Diffractometer (model number C72298-A223-B-9-POZ-228, manufactured by the Siemens Company of West Germany) using copper K-alpha radiation and a diffracted beam graphite monochrometer.

In addition to determining the presence and amount of various components, the XRD analysis also indicates the number of and identity of the crystalline phases present in the material being analyzed.

Additionally, one may determine the presence and/or the amounts of various elements in applicants' compositions by an electron spectroscopy method using an energy dispersive X-ray spectrometer ("EDX") unit such as, e.g., type Jeol C.35 (Japan) attached to a scanning electron microscope. See, e.g., the discussion of such technique presented in "Energy-Dispersive X-ray Microanalysis: An Introduction" (Kevex Instruments, Inc., San Carlos, Calif. 94070, 1989), the disclosure of which is hereby incorporated by reference into this specification.

It should be noted that the EDX analysis also will identify the number of and the identity of each atom present in each phase of the material being analyzed. Thus, the use of both the XRD and the EDX analyses will enable one to completely and thoroughly determine the number of phases in the system, the number of elements in each phase, the identify of each crystalline phase, the identify of each compound in the system, and the concentration of each phase, compound, and element.

The composite material of this invention also comprises at least about 20 weight percent of alpha alumina.

As is well known to those skilled in the art, alpha-alumina is the most dense, most stable form of alumina. It belongs to the trigonal system, has a refractive index of about 1.765, and melts at about 2,040 degrees centigrade. See, e.g., pages 21–24 of the January, 1989 issue of "Ceramic Industry" (published by Corcoran Communications, Inc., Solon, Ohio), the disclosure of which is hereby incorporated by reference into this specification.

It is preferred that the composite material of this invention contain at least about 25 weight percent of said alpha alumina.

Both the beta-sialon and the alpha-alumina material in the composite are single-phase, that is, they are crystallographically pure.

The composite material of this invention may also contain from about 1 to about 10 weight percent of single-phase silicon oxynitride, which is of the formula $Si_2ON_2$. In one embodiment, the composite material contains from about 1 to about 5 weight percent of said silicon oxynitride. In another embodiment, the composite material contains 0 percent of said silicon oxynitride.

The composite material of this invention contains 0 percent of silicon nitride, which has the formula $Si_3N_4$. The presence of said silicon nitride in the prior art "sialon" materials tends to inhibit their sinterability; and, because of its poor diffusion, it presence causes density gradients in the pressureless sintered products. Its absence in applicants' material facilitates the pressureless sintering of such material, increases the shrinkage of the sintered material, and helps to insure the production of a more uniform product.

The composite material of this invention may be sintered without pressure and without the use of sintering aids. It is preferred, however, to mix such composite material with a binder system containing at least one of binder, plasticizer, lubricant, and surfactant, prior to forming it. As is known to those skilled in the art, one substance often can serve as both binder and/or plasticizer and/or lubricant and/or surfactant.

Binders are substances which serve to hold low greenstrength ceramic materials and bodies together and give them sufficient bonding for handling and machining in all prefiring stages of manufacture. See, e.g., page 36 of the January, 1989 issue of "Ceramic Industry," supra. As is well known to those skilled in the art, a binder may often be used together with a plasticizer to modify the viscoelastic properties of a condensed binder-phase film on the particles; see, e.g., pages 174–179 of James S. Reed's "Introduction to the Principles of Ceramic Processing" (John Wiley and Sons, New York, 1988), the disclosure of which is hereby incorporated by reference into this specification. Lubricants are substances which facilitate the flow of nonplastic or poorly plastic materials in the formation of dense compacts under pressure; see, e.g., page 80 of said January, 1989 issue of Ceramic Industry. It is also known that surfactant molecules may improve the compatibility of the solid with the liquid medium when they are adsorbed at the interface; see, e.g., pages 128–130 of said James E. Reed's book.

Some of the properties of applicants' novel sialon composition may be determined from a sintered body prepared from such composition. This test specimen is prepared in accordance with the procedure described below.

In order to prepare the test specimen, applicant's novel composite material is mixed with 5 weight percent of "METHOCEL" 20-231 cellulose ether binder (a methylcellulose polymeric material sold by the Dow Chemical Company of Midland, Mich.). The composite material/METHOCEL mixture may then be charged into a Carver test cylinder and pellet mold (catalog number 2090, Test Cylinder Outfit 1.125" internal diameter, Carver Hydraulic Equipment Catalog, published January, 1990 by Fred S. Carver Inc., Menomonee Falls, Wis., page number 6) and pressed with a Carver Laboratory Press (catalog number 2086, Model C, Carver Hydraulic Equipment Catalog, January, 1990, supra) at a pressure of 7 tons into cylinders which have a diameter of 1.125 inches and a height of about 1.125 inches. The pressed cylinders may then be placed into a debindering oven (Grieve cabinet oven, HA series, model number HA-850, Bulletin No. CA-400, "Industrial Ovens & Furnaces," published in 1987 by The Grieve Corporation, Round Lake, Ill. 60073) and heated under flowing nitrogen (at a flow rate of 1 gallon per minute) and atmospheric pressure at a temperature of 500 degrees centigrade for 90 minutes to remove the binder. Thereafter, the debindered cylinders may be placed into a graphite element furnace (model number 1000-45120-FP30, Thermal Technology Inc., Astro Division, Santa Barbara, Calif. After the cylinders have been placed into such furnace, they are contacted with flowing nitrogen (at a flow rate of 0.5 gallon per minute) and subjected to atmospheric pressure and at temperature of 1,620 degrees centigrade for 2.0 hours.

The sintered cylinders produced by this treatment, when the composite material of this invention is used in the test, will have a density of at least about 98 percent of its theoretical density. In general, the density of these sintered cylinders will be from about 2.94 to about 3.20 grams per cubic centimeter.

The sintered cylinders produced by the aforementioned treatment, when the composite material of this invention is used in the test, will have an elastic modulus of from about 300 to about 650 gigaPascals and, preferably, from about 530 to about 650 gigaPascals. The elastic modulus of said cylinders is determined in accordance with A.S.T.M. Standard Test C-848-78, the disclosure of which is hereby incorporated by reference into this specification.

The sintered cylinders produced by the aforementioned treatment, when the composite material of this invention is used in the test, will have a flexural strength of from about 300 to about 900 megaPascals and, preferably, from about 550 to about 700 megaPascals. The flexural strength of said cylinders is determined in accordance with A.S.T.M. Standard Test F-417-78, the disclosure of which is hereby incorporated by reference into this specification.

The sintered cylinders produced by the aforementioned treatment, when the composite material of this invention is used in the test, will have a wear resistance of from about 28 to about 20 cubic millimeters per 100 revolutions and, preferably, from about 24 to about 20 cubic millimeters per 100 revolutions. The wear resistance of said cylinders is determined in accordance with A.S.T.M. Standard Test B-611, the disclosure of which is hereby incorporated by reference into this specification.

The sintered cylinders produced by the aforementioned treatment, when the composite material of this invention is used in the test, will have a porosity of less than 2 percent. The porosity of said cylinders is determined in accordance with A.S.T.M. Standard Test C-373-72 (water absorption), the disclosure of which is hereby incorporated by reference into this specification.

The sintered cylinders produced by the aforementioned treatment, when the composite material of this invention is used in the test, will have a thermal shock resistance which is substantially superior to the thermal shock resistance obtainable with prior art sialon compositions. The thermal shock resistance of said cylinders is determined in accordance with A.S.T.M. Standard Test C-122-70, the disclosure of which is hereby incorporated by reference into this specification.

The sintered cylinders produced by the aforementioned treatment, when the composite material of this invention is used in the test, contain no silicon nitride.

The sintered cylinders produced by the aforementioned treatment, when the composite material of this invention is used in the test, contain no glassy phase. The presence or absence of a glassy phase in the sintered material may be determined by phase-contrast microscopy which, as is known to those skilled in the art, is a special method of controlled illumination using polarized light. See, e.g., pages 469–472 of Volume 8 of said McGraw-Hill Encyclopedia of Science & Technology, supra. In this process, one may use a metallograph, i.e., an optical instrument designed for both visual observation and photomicrography of prepared surfaces of opaque materials at magnifications ranging from about 25 to about 1,500 diameters. The metallograph consists of a high-intensity illuminating source, a microscope, and a camera bellows. It is preferred that the metallograph contain a source of polarized light. The glassy phase, when observed with such instrument, will appear as a dark field; and the crystalline phase will appear as a bright field.

Some examples of suitable metallographs are illustrated on pages 128-129 of J. T. Jones et al.'s "Ceramics: Industrial Processing and Testing" (Iowa State University Press, Ames, Iowa, 1972), the disclosure of which is hereby incorporated by reference into this specification.

The sintered cylinders produced by the aforementioned treatment, when the composite material of this invention is used in the test, will often have a density of at least about 98 percent of theoretical (calculated) density. The density of said cylinders is determined in accordance with A.S.T.M. Standard Test C-20-63, the disclosure of which is hereby incorporated by reference into this specification.

The beta-sialon phase in applicants' composite material contains from about 24.7 to about 34.7 percent of silicon, from about 23.9 to about 33.4 percent of aluminum, from about 14.1 to about 19.8 percent of oxygen, and from about 22.2 to about 27.3 percent of nitrogen, all as determined by said XRD analysis. It is preferred that the beta-sialon phase in applicants' composite material contains from about 26.7 to about 32.7 percent of silicon, from about 25.7 to about 31.5 percent of aluminum, from about 15.3 to about 18.6 percent of oxygen, and from about 23.2 to about 26.3 percent of nitrogen. In the most preferred embodiment, the beta-sialon phase in applicants' composite material contains about 29.7 percent of silicon, about 28.6 percent of aluminum, about 16.9 percent of oxygen, and about 24.7 percent of nitrogen.

Thus, by way of illustration, one may use an electron spectroscopy method using an energy dispersive spectrometer (EDAX) unit, type Jeol C.35(Japan) attached to a scanning electron microscope. See, e.g., applicant's Ph.D. thesis entitled "Study of Solid-State Aluminothermal Reactions: Influence of Activation and Moderation Processes," which was submitted to the Senate of the Technion-Israel Institute of Technology in Haifa, Israel in February of 1987, and which was published in April of 1987; the disclosure of this thesis is hereby incorporated by reference into this specification. Also see D. Becherescu et al.'s "Physical Methods in the Chemistry of Silicates," published in Romanian (Scientific and Encyclopedic Publishing House, Bucharest, Romania, 1977), and pages 135-255 of I. S. Butler et al.'s "Inorganic Chemistry" (The Benjamin/Cummings Publishing Company, Inc., Redwood City, Calif., 1989), the disclosures of which publications are hereby incorporated by reference into this specification.

In the process of this invention, an "activated" set of reactants is provided for a combustion-synthesis reaction. As used in this specification, the term "combustion-synthesis" refers to a self-sustained, highly exothermic synthesis, often referred to as "SHS." or "MTR."

"SHS," a self-sustained, highly exothermic process, is a self-propagating, high temperature form of combustion-synthesis; it is a chemical process involving an exothermic reaction between a metal and a nonmetal powder mixture.

"MTR," a metallo-thermic reduction process involving thermite-type reactions, is another form of combustion synthesis; it is a chemical process involving the reduction of oxides or other compounds of metals by igniting mixtures of these compounds with powdered metals.

Both SHS and MTR reactions are surface-type reactions in which there is minimal diffusion of the reactants through the product layers. In order to maximize the yield obtained with these reactions, the amount of contact between the reagents has to be maximized.

One means of maximizing contact between the reagents is to increase the density of contact points (the number of contact points per unit volume). This may be achieved by intensive mechanical treatment of a specified powder mixture.

The contact points between the reagents should be intimate; there must be intimate contact as close as possible to the molecular level. Intensive mechanical treatment helps insure penetration of the reagent particles into each other's structure and increases the number of intimate contact points.

Mechanochemistry involves the relations between mechanical work and mass transformation. Comminution is an intensive process of this kind, which acts through impact, compression, and attrition—with inputs of kinetic energy, shear energy, strain energy, and thermal energy—and which converts the materials involved into highly activated powders capable of polymorphic transformation and chemical reaction, accompanied by energy dissipation. Intensive mechanical treatment of reaction mixtures yields a highly activated material. The overall free energy is increased by contributions from the surface energy, as the perunit surface of the particulate system is increased under comminution. Furthermore, the overall free energy is also increased by contributions form the stored elastic strain energy, as the particles are deformed under the combination of the hydrostatic and shear components of the stress field.

Without wishing to be bound to any particular theory, applicant believes that a stage in mechanochemistry is mechanochemical activation, which may be explained by the accumulation of internal energy in the ground material. On the submicroscopical scale, very high temperatures develop at the impact points between particles during the extremely brief impacts caused by the grinding treatment; as a result, "magma-plasma" pockets are formed which send fragments of material, ions, electrons, etc. to the surroundings. At the same time, on the microscopic scale, the whole lattice network of the particle is disturbed by elastic waves and the state of activation sets in. The excess free energy is associated with the lattice elastic strain through morphological defects, and also through increase of the surface energy of the system as particles are fragmented (a macroscopic-scale effect).

In applicants' process, it is preferred to conduct the mechanochemical activation treatment while the sample is contacted with flowing nitrogen at a flow rate of from about 0.1 to about 0.5 gallons per minute.

Preparation of applicant's composition

FIG. 1 illustrates one preferred embodiment of the process of this invention. Referring to FIG. 1, mill 12, which may be a high-speed rotary ball mill, is used to activate the reaction mixture. One may also use a vibratory ball mill to comminute and activate the mixture. Additionally, or alternatively, one may use comminution means such as jet mills, attrition mills, high speed hammer mills, and the like. The function of each of these comminution means should be to introduce mechanical energy into the materials through an increase of surface energy and stored elastic strain energy and to increase the density of contact points between the reactants.

Mill 12 may be a vibratory mill. Vibratory mills are described on pages 8-29 to 8-30 of Robert H. Perry and Cecil H. Chilton's "Chemical Engineers' Handbook," Fifth Edition (McGraw-Hill Book Company, New York, 1973), the disclosure of which is hereby incorporated by reference into this specification. Thus, by way of illustration and not limitation, one may use a Sweco Vibratory Mill; suitable models include models M-18, M-45, M-60, and M-80; the operation of the Sweco vibratory mills is described in a publication entitled "SWECO Vibro-Energy Grinding Mills," revised 1986 (Sweco, Inc., Florence, Ky., 1986), the disclosure of which is hereby incorporated by reference into this specification. Thus, e.g., one may use an Allis-Chalmers Vibratory Mill; suitable models include models 1518-D, 3034-D, 3640-D, and 4248-D. Thus, e.g., one may use a Podmore-Boulton mill. Other manufacturers of vibratory ball mills (and other grinding equipment) are listed on page 79 of "Ceramic Source," Volume 3, 1987 (American Ceramic Society, Westerville, Ohio, 1987), the disclosure of which is hereby incorporated by reference into this specification.

In the process of this invention, when mill 12 is a vibratory ball mill, it is preferred to comminute the reaction mixture in it for a period of at least about 8 hours and, more preferably, from about 8 to about 24 hours; in one preferred embodiment, the mixture is comminuted in the vibratory mill for from about 12 to about 18 hours. It is preferred to run the vibratory mill at a "medium" setting.

High-intensity mill 12 may be a high-speed tumbling mill. These tumbling mills are well known to those skilled in the art and are described, e.g., on pages 8-25 to 8-29 of said Perry and Chilton's "Chemical Engineers' Handbook," the disclosure of which is hereby incorporated by reference into this specification. Manufacturers of such rotary mills are described on said page 79 of said "Ceramic Source."

In one preferred embodiment, the rotary mill 12 is a ball mill. By way of illustration and not limitation, one may use the ball mills described in Brinkman Instruments Company catalog R1.

One preferred rotary mill is the centrifugal ball mill. Some preferred centrifugal ball mills are described in sections 7 and 10 of catalog R1, Brinkman Instruments Co., Cantiague Road, Westbury, N.Y. 11590 (printed in West Germany in August, 1986), the disclosure of which is hereby incorporated by reference into this specification.

When high-intensity mill 12 is a rotary mill, it is preferred to operate it at a speed of at least 500 revolutions per minute for at least about 2 hours. In one embodiment, the rotary mill is operated for from about 2 to about 6 hours at a speed of from about 550 to about 850 revolutions per minute. In another embodiment, the mixture is comminuted in the mill for from about 3 to about 4 hours.

When one uses either a high-speed ball mill or a vibratory mill in the process of this invention, a specified grinding media should be used. In the first place, the grinding media should have a density at least about 6.0 grams per cubic centimeter. Thus, e.g., one may use zirconia media, stainless steel media, tungsten carbide media, and the like.

When a high-speed ball is used, the weight/weight ratio of grinding media/material to be ground should be at least about 6/1. With a vibratory ball mill, said weight/weight ratio should be at least about 8/1. The volume/volume ratio of the grinding media/material to be ground should be no more than about 3/1 in the ball mill and no more than about 4/1 in the vibratory mill.

Into high-intensity mill 12 is charged nitrogen via line 14, aluminum material via line 16, aluminum nitride via line 20, surfactant via line 22, and silica via line 28. The mill 12 is then operated until the mixture is substantially single phase.

The reaction mixture is comminuted until analysis reveals that it is comprised of substantially a single phase material, as shown by scanning electron microscopy. A sample of the reaction mixture in mill 12 may be periodically removed via line 24 to laboratory 26 wherein it may be subjected to analysis by a scanning electron microscope to determine whether it consists essentially of only one phase. See, e.g., FIGS. 5-11 to 5-13 of applicant's thesis, at page 79, wherein substantially single phase compositions are illustrated.

When mill 12 is a rotary mill, at least about 2 hours of comminution at a rate of at least 500 revolutions per minute is usually required to form a one-phase material. When mill 12 is a vibratory mill, at least about 8 hours of comminution at at least a medium setting is generally required to form a one-phase material.

The aluminum material used in the process may be either pure aluminum, aluminum alloy, or mixtures thereof. Suitable aluminum alloys include, for example, alloys of aluminum with lithium, silicon, magnesium, and the like.

In one preferred embodiment, illustrated in FIG. 1, the aluminum material is aluminum. This aluminum is charged to high intensity mill 12 via line 16. The aluminum used in this process is preferably a powder which contains less than about 1.0 percent, by weight, of combined oxygen. As used in this specification, the term "combined oxygen" refers to oxygen which is combined with aluminum and, usually, is in the form of a metal oxide. The amount of combined oxygen may be determined by evaluating the total oxygen present by conventional means such as, e.g., spectral analysis.

The aluminum or aluminum alloy should be in powder form and will have a specific surface area of from about 0.2 to about 1.1 square meters per gram.

In one embodiment, the aluminum material used is in the form of fine aluminum flakes.

In the material used in the process of this invention, the specified weight ratio is based upon the concentration of pure aluminum. When an aluminum alloy material is used, or when a mixture of aluminum or aluminum alloy material is used, the aluminum content of the alloy is first calculated, and this aluminum content is then used to determine the aluminum content of the material.

The particle size distribution of the aluminum material will range from about 4 to about 28 microns and, preferably, from about 6 to about 12 microns; substantially 100 percent of the aluminum particles will be within the specified size range. In one preferred embodiment, at least about 80 weight percent of the aluminum particles are between from about 6 to about 12 microns in size.

Particle size analysis may be conducted by means well known to those skilled in the art. Thus, e.g., one can use the procedures described on pages 8-2 to 8—8 of Perry and Chilton's "Chemical Engineers' Handbook," Fifth Edition (McGraw-Hill Book Company, New York, 1973).

The aluminum material used in the process is preferably substantially dry, i.e., it contains less than about 0.1 percent, by weight, of moisture.

From about 28 to about 38 percent of the aluminum material, by total weight of aluminum material, aluminum nitride, surfactant, and silica, is charged to the mill 12 via line 16. It is preferred to use from about 31 to about 36 weight percent of the aluminum material.

Aluminum nitride is charged to the mill 12 via line 20. Aluminum nitride is a relatively new material whose properties are described, e.g., on pages 25-27 of the May, 1989 issue of "Ceramic Industry" (Corcoran Communications Inc., Solon, Ohio).

From about 5 to about 25 weight percent of the aluminum nitride, by total weight of the aluminum, aluminum nitride, silica, and surfactant, is fed to mill 12 via line 20. It is preferred to use from about 10 to about 20 weight percent of the aluminum nitride.

One may use commercially available aluminum nitride products. Thus, e.g., one may use the high density aluminum nitride available from ICD Group, Inc. (641 Lexington Avenue, New York, N.Y.), product no. 06 26 561000 available from Hermann C. Starck, Inc. (280 Park Avenue, New York, N.Y.), Aldrich product number 24,193-0, and the like.

The aluminum nitride used in the process of this invention preferably contains less than about 2.0 weight percent of combined oxygen, has substantially all of its particles smaller than about 325 mesh (53 microns), and is substantially dry, containing less than about 0.1 percent of moisture. The reaction mixture comprised of the aluminum nitride also should be substantially dry; if it is not, aluminum nitride will hydrolyze to ammonia and alumina.

In one preferred embodiment, from about 0.1 to about 1.0 percent of surfactant, by total weight of aluminum material, aluminum nitride, surfactant, and silica, may be (but need not be) added to the mill 12 by line 22. As used in this specification, the term "surfactant" refers to a surface active agent, i.e., a substance that alters energy relationships at interfaces. It is preferred that, if a surfactant is used, it be a synthetic or natural organic compound which is liquid and which is preferably a nonionic surfactant. Some nonionic suitable surfactants are described in U.S. Pat. No. 4,477,259 of Funk, the disclosure of which is hereby incorporated by reference into this specification. Other nonionic surfactants are described and listed in McCutcheon's "Emulsifiers and Detergents," North American Edition (McCutcheon Division, MC Publishing Company, Glen Rock, N.J., 1981), the disclosure of which is hereby incorporated by reference into this specification.

The surfactant need not be used in the process. Its use enhances the safety of the process but in no way is it essential to the reaction which takes place.

In one embodiment, the surfactant used is anionic, and its solubilizing group(s) is preferably a carboxylate group. In another embodiment, the surfactant is cationic, and its solubilizing group(s) is selected from the group consisting of a primary amine group, a secondary amine group, a tertiary amine group, a quaternary ammonium group, and mixtures thereof.

In one preferred embodiment, the surfactant is a carboxylic acid containing from about 4 to about 26 carbon atoms. One preferred class of carboxylic acids is the saturated fatty acids containing from about 4 to about 26 carbon atoms. Another preferred class of carboxylic acids is the unsaturated fatty acids containing from about 4 to about 24 carbon atoms. The most preferred fatty acid is oleic acid.

In another embodiment, no surfactant is added to mill 12.

If a surfactant is added to mill 12, it is preferred to use a surfactant which will be volatilized at a temperature of 1,200 degrees centigrade. The use of such a surfactant guarantees that substantially no surfactant residue will be present in the sintered product.

Silica is added to the mill 12 via line 28. From about 45 to about 65 weight percent of silica, by total weight of aluminum material, aluminum nitride, surfactant, and silica, is added to mill 12. It is preferred to add from about 49 to about 63 weight percent of silica. In a more preferred embodiment, from about 53 to about 59 weight percent of silica is added to mill 12.

It is preferred that substantially all of the silica used in the process be smaller than about 53 microns. In one embodiment, substantially all of the silica particles are smaller than about 15 microns. One may use any commercially available silica with the correct particle size distribution.

The silica used in the process should be substantially dry, i.e., it should contain less than about 0.1 percent of moisture.

After the aluminum material, the aluminum nitride, the surfactant, and the silica have been charged to mill 12, the reaction mixture is milled under nitrogen until a substantially single phase composition has been produced. Samples of the mixture may be periodically withdrawn from the mill via line 24 and subjected to analysis in laboratory 26.

Once a substantially one-phase material has been formed in mill 12, the reaction mixture is discharged via line 30; thereafter, in one preferred embodiment (illustrated in FIG. 1), it is pelletized prior to the time it is ignited. In another embodiment, not shown, powder material from mill 12 is ignited without being pelletized.

In one preferred embodiment, the material discharged via line 30 is pelletized by pressing it into small pellets whose minimum size is at least about 1.0 inches. The pellet may be in the shape of a cylinder, a bar, etc. The pressure used in the pelletizing should be sufficient to confer enough strength to the pellets so that they can be handled without disintegrating. However, the porosity of the pellets should be at least about 40 percent.

It is preferred to press the pellets at a pressure of at least about 100 pounds per square inch.

Any conventional press may be used to pelletize the powder from mill 12. Thus, e.g., one may use a hydraulic press.

In one embodiment, a hydraulic press is used which is comprised of hydraulic pumps which are connected to plungers.

The pressed pellets may then be discharged via line 34 to reactor 36, in which they are ignited; alternatively, loose powder from line 30 may be ignited in reactor 36. Nitrogen may be flowed into the reactor prior to and during ignition; alternatively, an air environment may be used during ignition and combustion.

In one embodiment, the pellets from line 34 and/or material from line 30 are self ignited in reactor 36. The material to be ignited is placed in reactor 36 and is heated to a temperature of about 760 degrees centigrade until ignition occurs. Thus, e.g., the material to be ignited can be charged to a graphite boat, and the graphite boat assembly can be inserted into the reactor and heated until ignition occurs. In one aspect of this embodiment, the material from line 30 may be formed into a shaped body and heated to cause it to reaction sinter, thereby simultaneously forming the shaped body.

In another embodiment, the pellets are ignited by contacting them with a source of heat at a temperature of at least about 800 degrees centigrade such as, e.g., a torch, a hot wire, a spark, a laser beam, etc.

The combusted material is then allowed to cool to ambient temperature. In one embodiment, the ignited material is discharged to a refractory tray, wherein it is allowed to cool to ambient.

The cooled, combusted material then is crushed. In one embodiment, cooled, reacted pellets are crushed, preferably in a roller mill. The pellets are crushed so that substantially all of their particles are within the range of about 0.1 to about 0.5 millimeters. Any suitable roll crusher may be used. Thus, e.g., one may use a roll crusher having smooth rolls. Medium-peripheral speed mills (such as ring-roll mills, bowl mills, roll mills, etc.) may be used; see, e.g., pages 8–22 of said Perry and Chilton's book. The rolls in the crusher preferably are smooth.

Referring to FIG. 1, the crushed material may be discharged via line 42. Thereafter, it may either be used as is or subject to further size reduction.

The crushed matter from line 42 has a nitrogen content of at least about 4 weight percent. It contains at least about 30 weight percent of an alpha-alumina phase, from about 5 to about 25 weight percent of a silicon phase with contents of aluminum, oxygen, and nitrogen, and from about 45 to about 65 weight percent of a beta-sialon phase of the formula $Si_{6-z}Al_zO_zN_{8-z}$ (wherein z is from about 2.5 to about 3.5 and said beta-sialon has the composition described hereinabove). This material may be purified by conventional means well known to those skilled in the art.

Thus, by way of illustration, one may use the leaching process described in U.S. Pat. No. 3,960,581, the disclosure of which is hereby icnorporated by reference into this case. Thus, for example, one may use the leaching technology described on pages 375–410 of J. M. Coulson et al.'s "Chemical Engineering," Volume Two, Third Edition (Pergamon Press, Oxford, England, 1978), the disclosure of which is hereby incorporated by reference into this specification.

In one preferred embodiment, the silicon phase is removed from the material by dispersed solids leaching. This technique, which is also well known to those in the art, is described on pages 19-41 to 19-43 of Robert H. Perry and Cecil H. Chilton's "Chemical Engineers' Handbook," Fifth Edition (McGraw-Hill Book Company, New York, 1973), the disclosure of which is hereby incorporated by reference into this specification.

The crushed material from crusher 40 is passed via line 42 is passed to siever 44, which preferably is a two-deck vibratory sieve. This vibratory sieve preferably has at least two sieves which sequentially screen (and-/or treat) the crushed material.

The first screen in the vibratory sieve, into which the crushed material is first discharged, is 150 mesh. Material which passes through this sieve is then passed to the second vibratory sieve, which is 325 mesh.

Heat-treatment of the combusted material

Applicants have discovered that, when the crude combusted material described above is treated in accordance with a certain heat cycle, a beta-sialon product which contains no silicon nitride and no free silicon is produced.

It is well known that, at temperatures exceeding 1,000 degrees centigrade, silicon reacts in the presence of nitrogen to form silicon nitride. The reaction is exothermic and is used by many in the field to produce both silicon nitride and beta-sialon solid solutions containing silicon nitride. Thus, for example, U.S. Pat. No. 4,243,621 of Mori et al. discloses a process which produces an intermediate product which contains beta-sialon and free silicon (see column 10). Mori et al. heat this intermediate product at a temperature in excess of 1,000 degrees centigrade under nitrogen atmosphere in order to transform the free silicon to beta-silicon nitride. The teach that the silicon in the intermediate is highly active and may thus be readily nitrided to form the beta-silicon nitride.

In applicants' heat-treatment process, it is preferred to use impure, intermediate product substantially all of whose particles are smaller than 325 mesh (53 microns). Thus, for example, the material from siever 44 which passes through the 325 mesh may be passed via line 46 to furnace 48.

As indicated in another portion of applicants' specification, the presence of silicon nitride is disadvantageous. Applicants have discovered a method of treating their intermediate product so that it produces a beta-sialon composition which contains no silicon nitride.

It is preferred to conduct the thermal conditioning treatment in a high-temperature furnace able to reach a temperature in excess of 1,600 degrees centigrade. Such furnaces are well known to those in the art and are described, e.g., on pages 606–612 of Volume 5 of the McGraw-Hill Encyclopedia of Science & Technology, supra.

In one preferred embodiment, the furnace 48 is a graphite furnace containing a graphite heating element; and the thermal conditioning treatment is conducted under nitrogen atmosphere. Such a furnace, e.g., is the graphite element furnace available as model number 1000-45120-FP30 from Thermal Technology, Inc., Astro Division, of Santa Barbara, Calif.

In another embodiment, the furnace 48 is a rotary furnace. Thus, e.g., one may use a rotary furnace obtainable from Advanced Vacuum Systems of Ayer, Mass. 01432.

Referring to FIG. 1, the sieved material is passed via line 46 to furnace 48. A nitrogen source 52 supplies nitrogen atmosphere to the furnace after the material has been loaded into the furnace.

The sieved material may be placed into a refractory container prior to being placed into the furnace; the use of such a container will prevent the material from being contaminated by carbon from the graphite heating element. It is preferred that such container substantially encapsulate the sieved material.

In one embodiment, the refractory container is a high-temperature furnace tube which is obtainable from, e.g., the McDanel Refractory Company of Beaver Falls, Pa. The material is charged into such a tube, the tube is then placed into the furnace, and nitrogen is caused to flow from one end of the tube to another through the material.

Once the sieved material is in the furnace, the furnace door is closed, and the furnace is purged with nitrogen. Thereafter, the temperature of the furnace is raised from ambient to a temperature of from about 800 to about 1,000 degrees centigrade. It is preferred to raise the temperature from ambient to from about 850 to about 950 degrees centigrade. It is even more preferred to use a temperature of about 900 degrees centigrade.

It is preferred to raise the temperature of the furnace from ambient at a rate of from about 5 to about 15 degrees per minute and, preferably, from about 8 to about 12 degrees per minute. It is most preferred to use a rate of about 10 degrees per minute.

Nitrogen is flowed over the sieved material as its temperature is being raised. It is preferred to use a sufficient amount of nitrogen so that it flows through the sieved material at a rate of from about 4 to about 10 liters per minute and exerts a pressure upon said material of from about 2 to about 7 pounds per square inch gravity.

Once the sieved material has reached the temperature of from about 800 to about 1,000 degrees centigrade, it is maintained at this temperature for from about 15 to about 60 minutes while it is contacted with a sufficient amount of nitrogen so that the nitrogen flows through he material at a flow rate of from about 4 to about 10 liters per minute and exerts a pressure upon said material of from 2-7 p.s.i.g.

After this initial heat treatment, the temperature of furnace is then raised to from about 1240 to about 1260 degrees centigrade at a rate of from about 5 to about 15 degrees per minute. It is preferred to raise the temperature to 1,250 degrees centigrade at a rate of about 8 to about 12 degrees per minute. During this temperature increase, the sieved material is contacted with a sufficient amount of nitrogen so that the nitrogen flows through the material at a flow rate of from about 1 to about 4 liters per minute and exerts a pressure upon said material of from about 14 to about 16 p.s.i.g.

Once the material has reached the temperature of from about 1240 to about 1260 degrees centigrade, it is maintained at this temperature for from about 30 to about 90 minutes (and preferably for from about 45 to about 75 minutes) while being contacted with a sufficient amount of nitrogen so that the exerts a pressure upon said material of from 14 to about 16 p.s.i.g. During this time, the nitrogen flow rate is less than about 1 liter per minute, preferably being substantially 0 liters per minute.

After the material has been maintained at 1240-1260 degrees centigrade for 30-90 minutes, its temperature is then raised to from about 1400 to about 1500 degrees centigrade at a rate of from about 5 to about 15 degrees per minute while being contacted with a sufficient amount of nitrogen so that the nitrogen flows through he material at a flow rate of from about 1 to about 4 liters per minute and exerts a pressure upon said material of from about 14 to about 16 pounds per square inch gravity. It is preferred to raise the temperature of the material to from about 1430 to about 1470 degrees centigrade. It is even more preferred to raise the temperature of the material to about 1450 degrees centigrade.

Once the material has reached the temperature of 1400-1500 degrees centigrade, it is maintained at such temperature for from about 30 to about 90 minutes while being contacted with a sufficient amount of nitrogen so that the nitrogen flows through the material at a flow rate of at least about 1 liter per minute and exerts a pressure upon said material of at least about 14 p.s.i.g.

Thereafter, the material is cooled to a temperature of from about 1000 to about 800 degrees centigrade while being contacted with a sufficient amount of nitrogen so that the nitrogen flows through the material at a flow rate of at least about 1 liter per minute and exerts a pressure upon said material of at least about 14 p.s.i.g.; the rate of cooling is from about 5 to about 15 degrees per minute and, preferably, is from about 8 to about 12 degrees per minute.

Once the material has been cooled to a temperature of from about 1,000 to about 800 degrees centigrade, it is then allowed to cool to ambient without any external cooling means; however, during this cooling, it is still maintained under a sufficient amount of nitrogen so that the nitrogen flows through the material at a flow rate of from at least about 1 liter per minute and exerts a pressure upon said material of at least about 2 pounds per square inch.

This heat treatment process unexpectedly produces a betasialon composition which contains no silicon nitride and no free silicon.

The heat-treated material may be discharged from furnace 48 and passed via line 54 to crusher 56, wherein it may be crushed so that substantially all of its particles are smaller than 325 mesh. Thereafter, the crushed powder may be passed via lie 58 to siever 60, which may be similar to siever 44. The material which passes through the bottom of siever 60 will have all of its particles smaller than 53 microns.

Preparation of beta-sialon whiskers

In substantial accordance with the procedure described for the preparation of the beta-sialon composite material, beta-sialon composite material containing beta-sialon whiskers and/or platelets may be prepared.

In this embodiment, a mixture comprised of an activated aluminum reagent is utilized. Without wishing to be bound to any particular theory, applicant believes that the surface of the activated aluminum reagent is comprised of active groups which contain elemental alkali metal, fluorine, oxygen, and aluminum linked in pseudo-chemical bonds on the solid surface. These groups are believed to be responsible for the shifting of the x-ray diffraction peaks of the aluminum more than 0.1 degree and for the dilatation of the contact zone between the reactants.

FIG. 1 illustrates one preferred aspect of this embodiment of the process of this invention. Referring to FIG. 1, mill 12, which may be a high-speed rotary ball mill, is used to activate the reaction mixture. One may also use a vibratory ball mill to comminute and activate the mixture. Additionally, or alternatively, one may use comminution means such as jet mills, attrition mills, high speed hammer mills, and the like. The function of each of these comminution means should be to introduce mechanical energy into the materials through an increase of surface energy and stored elastic strain energy and to increase the density of contact points between the reactants.

In the process of this invention, when mill 12 is a vibratory ball mill, it is preferred to comminute the reaction mixture in it for a period of at least about 8 hours and, more preferably, from about 8 to about 24 hours; in one preferred embodiment, the mixture is comminuted in the vibratory mill for from about 12 to about 18 hours. It is preferred to run the vibratory mill at a "medium" setting.

In one preferred embodiment, the rotary mill 12 is a ball mill. By way of illustration and not limitation, one may use the ball mills described in Brinkman Instruments Company catalog R1.

When high-intensity mill 12 is a rotary mill, it is preferred to operate it at a speed of at least 500 revolutions per minute for at least about 1 hour. In one preferred embodiment, the rotary mill is operated for from about 2 to about 6 hours at a speed of from about 550 to about 850 revolutions per minute for at least about 1 hour.

When one uses either a high-speed ball mill or a vibratory mill in the process of this invention, a specified grinding media should be used. In the first place, the grinding media should have a density at least about 6.0 grams per cubic centimeter. Thus, e.g., one may use zirconia media, stainless steel media, tungsten carbide media, and the like.

When a high-speed ball is used, the weight/ratio of grinding media/material to be ground should be at least about 6/1. With a vibratory ball mill, said weight/weight ratio should be at least about 8/1. The volume/volume ratio of the grinding media/material to be ground should be no more than about 3/1 in the ball mill and no more than about 4/1 in the vibratory mill.

Into high-intensity mill 12 is charged nitrogen via line 24, aluminum material via line 16, fluoride compound via line 18, aluminum nitride via line 20, and surfactant via line 22. The mill 12 is then operated until the aluminum component is activated; silica is then charged via line 28, and the mixture is then further comminuted.

The aluminum material used in the process may be either pure aluminum, aluminum alloy, or mixtures thereof.

In one preferred embodiment, illustrated in FIG. 1, the aluminum material is aluminum. This aluminum is charged to high intensity mill 12 via line 16. The aluminum used in this process is preferably a powder which contains less than about 1.0 percent, by weight, of combined oxygen. The aluminum or aluminum alloy should be in powder form and will have a specific surface area of from about 0.2 to about 1.1 square meters per gram.

In one embodiment, the aluminum material used is in the form of fine aluminum flakes.

In the pellet used in the process of this invention, the specified weight ratio is based upon the concentration of pure aluminum.

The particle size distribution of the aluminum material will range from about 4 to about 28 microns and, preferably, from about 6 to about 12 microns; substantially 100 percent of the aluminum particles will be within the specified size range. In one preferred embodiment, at least about 80 weight percent of the aluminum particles are between from about 6 to about 12 microns in size.

The aluminum material used in the process is preferably substantially dry, i.e., it contains less than about 0.1 percent, by weight, of moisture.

From about 32 to about 45 percent of the aluminum material, by total weight of aluminum material, fluoride compound, aluminum nitride, surfactant, and silica, is charged to the mill 12 via line 16. It is preferred to use from about 35 to about 43 weight percent of the aluminum material. In an even more preferred embodiment, from about 37 to about 41 percent of aluminum material is used.

A metal fluoride compound is charged into mill 12. The fluoride compound is preferably selected from the group consisting of sodium fluoride, sodium hydrogen fluoride, potassium fluoride, potassium hydrogen fluoride, lithium fluoride, hydrogen fluoride, and mixtures thereof. The preferred fluoride compound is sodium fluoride.

From about 1 to about 20 percent of said fluoride compound, by total weight of aluminum material, fluoride compound, aluminum nitride, and silica, is charged via line 18. It is preferred to use from about 5 to about 15 weight percent of the fluoride compound.

The fluoride compound used in the process is preferably anhydrous. The term "anhydrous," as used in this specification, refers to an inorganic compound that does not contain water either adsorbed on its surface or combined as water of crystallization.

The fluoride compounds which are commercially available may be used. Thus, by way of illustration and not limitation, referring to the 1988–1989 Aldrich Catalog (Aldrich Chemical Company, Inc., 940 West Saint Paul Avenue, Milwaukee, Wis.), one may use reagent 21,538-4 (potassium fluoride, anhydrous), reagent 21,115-4 (sodium fluoride), and the like.

It is preferred that all of the fluoride compound particles be less than about 100 mesh (150 microns)

Aluminum nitride is charged to the mill 12 via line 20. Aluminum nitride is a relatively new material whose properties are described, e.g., on pages 25–27 of the May, 1989 issue of "Ceramic Industry" (Corcoran Communications Inc., Solon Ohio).

From about 1 to about 15 weight percent of the aluminum nitride, by total weight of the aluminum, fluoride compound, aluminum nitride, silica, and surfactant, is fed to mill 12 via line 20. It is preferred to use from about 5 to about 10 weight percent of the aluminum nitride. It is preferred that all of the aluminum nitride particles be smaller than 325 mesh (53 microns).

One may use commercially available aluminum nitride products. Thus, e.g., one may use the high density aluminum nitride available from ICD Group, Inc. (641 Lexington Avenue, New York, N.Y.); product no. 06 26 561000 available from Hermann C. Starck, Inc. (280 Park Avenue, New York, N.Y.); Aldrich product number 24,193-0; and the like.

The aluminum nitride used in the process of this invention preferably contains less than about 2.0 weight percent of combined oxygen, has substantially all of its particles smaller than about 325 mesh (53 microns), and is substantially dry, containing less than about 0.1 percent of moisture. The reaction mixture comprised of the aluminum nitride also should be substantially dry; if it is not, aluminum nitride will hydrolyze to ammonia and alumina.

From about 0.1 to about 1.0 percent of surfactant, by total weight of aluminum material, fluoride compound, aluminum nitride, surfactant, and silica, may be (but need not be) added to the mill 12 by line 22.

Once the aluminum material, the fluoride compound, the aluminum nitride, and (optionally) the surfactant have been charged to the mill and briefly mixed, x-ray diffraction analysis with internal standard may be conducted on a sample of the "time zero" comminution to determine the position of the major aluminum reflection in the sample.

The term "X-ray diffraction" refers to the reflection at definite and characteristic angles from space lattices of crystals of X-rays which have been caused to bombard them, thus giving data for identification of characteristic lattice structure of a given species of material. The X-ray diffraction technique is well known to those skilled in the art. See, e.g., pages 652–658 of Volume 14 of the McGraw-Hill Encyclopedia of Science & Technology (McGraw-Hill Book Company, New York, 1977); C. Barrett and T. B. Massalski, "Structure of Metals," 3rd edition, 1966; M. J. Buerger, "Crystal Structure Analysis," 1960; C. Finback, "Structures of liquids: I–II," Acta Chem. Scand., 3: 1279–1308, 1949; A. H. Narten and H. A. Levy, "Observed diffraction patterns and proposed models of liquid water," Science, 165 (3892): 447, 1969; and G. H. Stout and L. H. Jensen, "X-Ray Structure Determination," 1968. The disclosure of each of the aforementioned publications is hereby incorporated by reference into this specification.

The procedure for evaluating the shift of the major aluminum peak is described, e.g., in the aforementioned D. Becherescu et al.'s "Physical Methods in the Chemistry of Silicates," supra, at pages 37–72; also note the references cited at pages 132–133 of this book, which are hereby incorporated by reference into this specification. In section 5.2.2. of applicant's thesis, referred to above, this type of shift is discussed and illustrated.

In one preferred embodiment, the X-ray diffraction analysis is conducted on a Siemens D-500 Diffractometer (model number C72298-A223-B-9-POZ-288, manufactured by the Siemens Company of West Germany) using copper K-alpha radiation and a diffracted beam graphite monochrometer.

After the "time zero" X-ray diffraction analysis has been conducted, the reagent mixture is comminuted in mill 12. Samples of the mixture may be periodically withdrawn from the mill via line 24 and subjected to X-ray diffraction analysis with internal standard in laboratory 26 to ascertain the position of the major aluminum reflection in the sample. When X-ray diffraction analysis of the sample indicates that the major aluminum reflection has shifted at least 0.1 degree from its time zero position, the comminution is stopped to add silica to the mixture.

Without wishing to be bound to any particular theory, applicant believes that the cause of the shift of the major aluminum reflection is the conversion of the aluminum surface to an amorphous alkali metal aluminate containing aluminum oxide-aluminum nitride solid solution. It is to be understood that, during the comminution process, new surfaces are constantly being created and exposed to the environment; these newly created surfaces will have an enhanced adsorption capacity.

Once the structure of the mixture in mill 12 has been modified such that the major aluminum peak has shifted at least 0.1 degree, silica is added to the mill 12 via line 28. From 55 to about 75 weight percent of silica, by weight of the mixture in mill 12, is added to mill 12. It is preferred to add from about 59 to about 69 weight percent of silica. In a more preferred embodiment, from about 60 to about 65 weight percent of silica is added to mill 12.

It is preferred that substantially all of the silica used in the process be smaller than about 53 microns. In one embodiment, substantially all of the silica particles are smaller than about 15 microns. One may use any commercially available silica with the correct particle size distribution.

The silica used in the process should be substantially dry, i.e., it should contain less than about 0.1 percent of moisture.

After the silica has been added to mill 12, comminution resumes; as before, the comminution is conducted under nitrogen atmosphere, with the nitrogen flow rate such that the pressure in the mill is preferably slightly above atmospheric. The reaction mixture is comminuted until analysis reveals that it is comprised of substantially a single phase material, as shown by scanning electron microscopy. A sample of the reaction mixture in mill 12 may be periodically removed to a laboratory (not shown) wherein it may be subjected to analysis by a scanning electron microscope to determine whether it consists essentially of only one phase. See, e.g., FIGS. 5-11 to 5-13 of applicant's thesis, at page 79, wherein substantially single phase compositions are illustrated.

When mill 12 is a rotary mill, at least about 2 hours of comminution at a rate of at least 500 revolutions per minute is usually required to form a one-phase material. When mill 12 is a vibratory mill, at least about 16 hours of comminution at at least a medium setting is generally required to form a one-phase material.

Once a substantially one-phase material has been formed in mill 12, the reaction mixture is discharged via line 30; and it thereafter is pelletized. It is preferred to pelletize this material by pressing it into small pellets whose minimum size is at least about 0.25 inches. The pellet may be in the shape of a cylinder, a bar, etc. The pressure used in the pelletizing should be sufficient to confer enough strength to the pellets so that they can be handled without disintegrating. However, the porosity of the pellets should be at least about 40 percent.

It is preferred to press the pellets at a pressure of at least about 100 pounds per square inch.

Any conventional press may be used to pelletize the powder from mill 12. Thus, e.g., one may use a hydraulic press.

In one embodiment, a hydraulic press is used which is comprised of hydraulic pumps which are connected to plungers.

The pressed pellets may then be discharged via line 34 to reactor 36, in which they are ignited. Nitrogen may be flowed into the reactor prior to and during ignition; alternatively, an air environment may be used during ignition and combustion. Any suitable source of heat, such as a spark, a beam, a hot wire, a hot strip, and the like, can be used to ignite the pellets. It is preferred to use either a hot wire or a hot strip to ignite the pellets.

In one preferred embodiment, the pellets are ignited with a hot wire. A chromel-alumel hot wire which is red-hot and at a temperature of at least about 800 degrees centigrade is used.

In one embodiment, a graphite strip, known as "GRAFOIL" (Union Carbide Corporation) may be used to ignite the pellets.

In another embodiment, a silicon carbide igniter is used to ignite the pellets.

Once the pellets are ignited, the ignition point transforms in a hot, incandescent spot which starts to spin around the pellet, stratifying the product; "spin combustion" occurs.

In the ignition process, a minor portion of the surface of the pellet is subjected to a temperature of at least 700 degrees centigrade. It is preferred that the area of the ignition point on the pellets be at least about 1 square millimeter. That portion of the surface which is contacted with the heat source to ignite the pellets will not form whiskers; thus, it is preferred to keep such portion as small as possible. In general, the surface area of such portion must be less than about 5% of the total surface area of the pellet.

The combusted pellets in this embodiment of the process of the invention may be treated in the same manner described in another portion of this specification with regard to the preparation of the beta-sialon composite material. Thus, in this aspect, the combusted pellets may be crushed in crusher 40 and/or sieved in siever 44 and/or heat-treated in furnace 48 and/or crushed in crusher 56 and/or sieved in siever 60.

Preparation of a green body containing applicant's composition.

The material made in applicant's process, with or without beta-sialon whisker material, be used to prepare a green body. Thus, e.g., one may use the sieved material discharged from siever 60. Thus, one may prepare a material with other particle size(s) for use in the green body.

A sufficient amount of the material produced in applicant's process will be mixed with green body additives so that the green body will contain at least 70 percent, by weight, of a composition which consists essentially of: (1) the beta-sialon powder and/or whisker material described above, (2) alpha alumina, and (3) silicon oxynitride. It is preferred that the green body contain from about 75 to about 92 weight percent of said composition.

The green body preferably contains at least one material selected from the group consisting of binders, lubricants, surfactants, plasticizers, and mixtures thereof. Typical binders and lubricants which may be used include unsaturated fatty acids (such as, e.g., stearic or oleic acid), organic materials, starches, gums, waxes, dextrine, corn flower, polyvinyl alcohol, marine derivatives, lignin extracts, methyl cellulose, and the like. It is preferred that the binder and/or lubricant used burn out of the ceramic body at temperatures below 400 degrees centigrade so that they will not interfere with ceramic reactions which occur at higher temperatures.

When a binder is used, it preferably is organic. Preferred organic binders include natural gums (such as xanthan gum, gum arabic, and the like), polysaccharides (such as refined starch, dextrine, and the like), lignin extracts (such as paper liquor), refined alginate (such as sodium or ammonium alginate), cellulose ethers (such as methyl cellulose, hydroxyethyl cellulose, sodium carboxymethyl cellulose, and the like), polymerized alcohols (such as polyvinyl alcohol), other vinyl binders (such as polyvinyl acetate, polyacrylamide, polyvinyl pyrolidone, and the like), polymerized butyral (such as polyvinyl butyral), acrylic resins (such as polymethyl methacrylate), glycols (such as polethylene glycol), waxes (such as paraffin, bee's wax, wax emulsions, microcrystalline wax, and the like), and the like.

One preferred class of binders are the vinyl binders which are soluble in water. These binders are preferably selected from the group consisting of polyvinyl acetate, polyvinyl alcohol, polacrylamide, polvinyl pyrolidone, and mixtures thereof.

In one preferred embodiment, the aforementioned composition is ground until at least about 95 weight percent of its particles are smaller than about 53 microns, and from about 75 to about 92 weight parts of the ground material is mixed with from about 25 to about 8 parts of polyvinyl alcohol. In this embodiment, the polyvinyl alcohol is preferably in the form of an aqueous solution containing less than about 20 weight percent of the active ingredient (polyvinyl alcohol) and water.

Another preferred class of binders are the waxes. Common waxes used as film-type binders are paraffin derived from petroleum, candelella and carnuba waxes derived from plants, and beeswax of insect origin. Paraffins are mixtures of straight-chain saturated hydrocarbons which tend to crystallize as plates or needles. Microcrystalline waxes are branched chain saturated hydrocarbons also derived from petroleum. The plant waxes are more complex mixtures of straight chain hydrocarbons, esters, acids, and alcohols that are relatively hard and have a relatively hard melting point of 85–90 degrees centigrade.

In one embodiment, at least one of the additives used in the green body is a lubricant. As is known to those skilled in the art, lubricants are materials which facilitate the flow of nonplastic, or poorly plastic, materials in the formation of dense compacts; and they are especially useful in dry pressing.

By way of illustration and not limitation, typical lubricants which may be used in the green body include kerosene-lard oil (also known as die oil), graphite, talc, clay, and mica, number 4 fuel oil, stearic acid, stearates, dispersed stearates, cetyl alcohol, camphor, mineral oils, starches, alginates, polyvinyl alcohol, polyvinyl acetate, wax emulsions, solid waxes, methyl cellulose, and the like.

Forming a green body by injection molding

In one preferred embodiment, a green body is formed by an injection molding process. In this process, it is preferred to mix from about 75 to about 92 parts of applicant's composition, with a particle size such at least about 95 percent of its particles are smaller than 53 microns, with from about 25 to about 8 parts of thermoplastic binder.

The injection molding process is well known to those skilled in the art and is described, e.g., on pages 590 to 592 of Brage Golding's "Polymers and Resins" (D. Van Nostrand Company, Inc., Princeton, N.J., 1959), the disclosure of which is hereby incorporated by reference into this specification. Injection molding of ceramic materials is described on pages 373 to 377 of James S. Reed's "Introduction to the Principles of Ceramic Processing" (John Wiley & Sons, New York, 1988), the disclosure of which is also hereby incorporated by reference into this specification.

In this embodiment, in addition to using thermoplastic binder, one may also mix applicant's composition with a surfactant such as, e.g., oleic acid. In general, from about 75 to about 92 percent of the composition is dispersed in from about 8 to about 25 percent of the binder. Thereafter, the mixture is injection molded into a green body at a preferred pressure of from about 4 to about 8 atmospheres.

Forming a green body by other means

Applicant's composition may be mixed with one or more of said binders and/or lubricants and formed into green bodies by conventional means. Thus, by way of illustration, one may dry press the mixture at a pressure of from between about 35 to about 200 megaPascals, one may use hot pressing, one may use isostatic pressing, and one may use any of the conventional means known to those skilled in the ceramic art for forming green bodies from powder mixtures.

In one preferred embodiment, the binder used in the mixture to be pressed is a polyvinyl alcohol aqueous solution which contains no more than about 20 percent, by weight of solution, of polyvinyl alcohol. From about 8 to about 25 parts, by weight, of this solution are preferably mixed with from about 75 to about 82 parts of applicant's composition, preferably with a composition which contains particles at least about 95 percent of which are smaller than 53 microns.

Debindering the green body

After the green body comprised of applicant's composition has been formed, it is preferred to subject it to conditions to insure that it has substantially no moisture and substantially no organic matter in it prior to the time it densified.

The green body will be densified by heating it to a temperature of from about 1,500 to about 1,700 degrees centigrade, preferably for from about 1 to about 4 hours. It is preferred that, prior to densification, the green body contain less than about 0.1 percent of moisture. Thus, one may dry the green body by conventional means until it has the desired moisture content.

As is known to those skilled in the art, the temperature and time required for drying will vary with conditions such as, e.g., the thickness of the green body, the humidity, the air velocity, etc. By way of illustration, in one preferred embodiment, in which the green body contains about 8 parts by weight of a 5.0 percent solution of polyvinyl alcohol, the green body is dried at the rate of from about 0.5 inch per hour by being subjected to a temperature of from about 105 to about 150 degrees centigrade; in this embodiment, the drying also serves to remove the polyvinyl alcohol from the green body.

It is also preferred prior to densification to remove substantially all of the organic material in the green body from the green body so that the green body contains less than about 1.0 weight percent of such organic matter. This debindering can also be accomplished by conventional means, by heating the green body until the organic matter in it is burned out. As is known to those skilled in the art, the debindering conditions will vary with factors such as the type(s) and concentration(s) of the organic material in the green body, the thickness of the green body, etc. By way of illustration, in one embodiment in which the green body contains about 8 weight percent of an organic binder, the green body is heated over a period of from about 8 to about 24 hours, in various steps, to temperatures of 150-180, 250, 400-800, and 800-1100 degrees centigrade.

It is often required to heat the green body to a temperature of at least about 400 degrees centigrade to burn out the hydrocarbon matter in it.

Densifying the debindered green body

It is preferred to provide a green body for densifying which contains less than about 0.1 percent moisture and less than about 1.0 percent of organic matter. This green body is preferably densified by heating it under nitrogen to a temperature of from about 1,500 to about 1,750 degrees centigrade for from about 1 to about 4 hours. The densified body formed by this process contains at least 70 weight percent of a material of the formula $Si_{6-z}Al_zO_zN_{8-z}$, wherein z is from about 2.5 to about 3.5.

Minimizing the amount of silicon oxynitride in the composition

In both aspects of applicants' process, the composition produced may contain silicon oxynitride. In certain cases, it is desired to minimize or completely eliminate silicon oxynitride from the composition. This may be done during the heat-treatment.

In order to minimize and/or eliminate the silicon oxynitride during the heat treatment, one may replace some of the nitrogen used during the first part of the heat-treatment cycle with hydrogen. During the aforementioned heat-treatment cycle, at every stage of the heat treatment from ambient up to about 1,240-1,260 degrees centigrade, the 100 percent nitrogen is replaced by a mixture of nitrogen and hydrogen containing at least 95 percent nitrogen (by volume) and from about 2 to about 5 percent (by volume) of hydrogen. The remainder of the heat treating cycle, including the cooling down period, remains the same.

Applicants do not know why the use of a minor portion of hydrogen during the heat-treating cycle substantially eliminates the formation of silicon oxynitride.

Whisker-reinforced beta-sialon material

In one embodiment, applicants provide a composite material containing from about 80 to about 94 weight percent of either and/or both of their beta-sialon/alpha-alumina compositions, and from about 6 to about 20 weight percent of whiskers selected from the group consisting of silicon carbide whiskers, titanium carbide whiskers, silicon nitride whiskers, titanium nitride whiskers, and mixtures thereof. The composite material thus provided has a fracture toughness which is substantially greater than the fracture toughness of the unreinforced beta-sialon/alpha alumina composite material.

In one embodiment, the sieved material from siever 60 is mixed with from about 6 to about 20 weight percent of one or more of the aforementioned whiskers. One may use commercially available whisker materials. Thus, e.g. one may use the silicon carbide and/or the titanium carbide whiskers sold by the Benchmark Structural Ceramics Corporation of Amherst, N.Y. Thus, e.g., one may use silicon carbide whiskers and/or silicon nitride whiskers produced by Tateho Chemical Industries Co., Ltd. and supplied in the United States by the ICD Group of New York, N.Y.

The silicon carbide and/or silicon nitride whiskers may be mixed with applicants' beta-sialon composition by conventional means; see, e.g., U.S. Pat. No. 4,818,635. Thus, e.g., one may mix the components in a ball mill.

The following examples are presented to illustrate the claimed invention and is not to be deemed limitative thereof. Unless otherwise specified, all parts are by weight, and all temperatures are in degrees centigrade.

EXAMPLES OF THE PREFERRED EMBODIMENT

EXAMPLE 1

20 grams of aluminum powder (type 1401T, Aluminum Company of America), 2.6 grams of aluminum nitride (catalog number 11546, Johnson Matthey/AESAR Group, Seabrook, N.H.), 0.27 grams of oleic acid (catalog number OL 103, Spectrum Chemical Manufacturing Corp., Gardena, Calif.), and 32 grams of silica (catalog number 13024, Johnson Matthey/AESAR Group) were charged to a stainless steel vessel with a capacity of 250 cubic centimeters (part 27-17-229-6, Brinkman Instruments Company, Cantiague Road, Westbury, N.Y. 11590) along with 6 tungsten carbide balls having a total weight of 374 grams (part number 27-17-474-4, Brinkman Instruments Company). The vessel was then covered with an aluminum aeration cover (part number 27-16-219-3, Brinkman Instruments Company). This aluminum cover permits the introduction of nitrogen gas during comminution.

The covered vessel was then introduced into a centrifugal ball mill (Centrifugal Ball Mill S-1, Brinkman Instruments Company, see page 38 of the R1 catalog). The speed used was about 540 revolutions per minute. The mixture was comminuted in this mode while under nitrogen purge for 3 hours.

The comminuted material was discharged from the vessel, and pellets of 1.125 inch diameter were pressed in a cylindrical die with a Carver Lab Press 13-872 (see page 897 of the Fisher '88 Catalog, Fisher Scientific Company); a pressure of 3 tons was used.

The pellets were charged into a graphite boat. The boat was then placed into a graphite reactor and, while under a nitrogen atmosphere, heated to a temperature of 760 degrees centigrade, at which temperature ignition occurred.

The combusted pellets were cooled by allowing the reactor to return to ambient temperature. The pellets were then removed from the reactor and crushed until their average size was less than about 1.0 millimeter.

The crushed pellets were then milled in a four-liter jar mill operated at a speed of 190 revolutions per minute for 8 hours; sintered corundum balls were used as the grinding media. Thereafter, this material was sieved on a 150 mesh sieve; substantially all of the material passed through the sieve.

The material which passed through the 150 mesh sieve was mixed with 0.05 weight percent of oleic acid, and this mixture was then ground in a four-liter jar mill operated at 190 r.p.m. with sintered corundum balls for 8 hours. The material produced by this grinding was then sieved with a 325 mesh sieve; substantially all of the material passed through this sieve.

A portion of the material passing through the 325 mesh sieve was subjected to X-ray diffraction analysis. Such analysis indicated that the material contained three major phases. One of these major phases was beta-sialon of the formula $Si_3Al_3O_3N_5$; this phase was present in the material at a concentration in excess of 45 weight percent. Another of these major phases was alpha-alumina, which was present in the material at a concentration in excess of 30 weight percent. A third major phase was a silicon phase, which was present in the material at a concentration in excess of 20 weight percent. Traces of aluminum nitride were present as a secondary phase.

A portion of the sieved material was subjected to analysis by Scanning Electron Microscope and Energy Dispersive Spectrometry, using the methods and apparatuses described in the specification. Such analysis indicated that the silicon phase in the material was associated with a content of aluminum, oxygen, and nitrogen.

The sieved material was charged into a 2.5 inch diameter furnace tube obtained from the McDanel Refractory Company of Beaver Falls, Pa. The furnace tube/sieved material assembly was then placed into a the graphite element furnace available as model number 1000-45120-FP30 from Thermal Technology, Inc., Astro Division, of Santa Barbara, Calif. This furnace was equipped with a nitrogen source.

The furnace door was closed, the furnace was purged with nitrogen, and nitrogen was caused to flow from one end of the tube to another through the material. The temperature of the furnace was raised from ambient to a temperature of 900 degrees centigrade at a rate of 10 degrees per minute.

Nitrogen was flowed over the sieved material as its temperature was being raised. The nitrogen flow was about 4 liters per minute, and the nitrogen pressure was 5 p.s.i.g.

Once the sieved material had reached the temperature of 900 degrees centigrade, it was maintained at this temperature for 30 minutes while the nitrogen flow was reduced to 1 liter per minute and the nitrogen pressure was increased to 15 p.s.i.g.

After this initial heat treatment, the temperature of furnace was then raised to 1,250 degrees centigrade at a rate of 10 degrees per minute. During this temperature increase, the nitrogen pressure and flow rate was maintained as before.

Once the material had reached the temperature of 1250 degrees centigrade, it was maintained at this temperature for 30 minutes. During this time, the nitrogen vent was closed so that the flow rate was substantially zero; the pressure in the reactor was about 16 p.s.i.g.

After the material had been maintained at 1250 degrees centigrade for 30 minutes, its temperature was then raised to 1,450 degrees centigrade at a rate of 10 degrees per minute. The nitrogen flow rate was 1 liter per minute, and the pressure was 15 p.s.i.g.

Once the material had reached the temperature of 1450 degrees centigrade, it was maintained at such temperature for 90 minutes. The nitrogen flow rate was 1 liter per minute, and the pressure was 15 p.s.i.g.

Thereafter, the material was cooled to a temperature of 900 degrees centigrade. During this cooling, the nitrogen flow rate was 1 liter per minute, and the pressure was 15 p.s.i.g. The rate of cooling was 10 degrees per minute.

Once the material had been cooled to a temperature of 900 degrees centigrade, it was then allowed to cool to ambient without any external cooling means; cooling was allowed to occur over a period of about 60 minutes. During this cooling, the nitrogen flow rate was 4 liters per minute, and the pressure was about 2 p.s.i.g.

The cooled material was removed from the furnace and crushed so that substantially all of its particles were smaller than 53 microns. Thereafter, the crushed material was passed through a twin-deck vibratory sieve whose first sieve was 150 mesh and whose second sieve was 325 mesh.

The material passing through the 325 mesh screen was then analyzed to determine its composition.

X-ray diffraction analysis indicated that material contained two major phases. The aforementioned beta-sialon was present as a major phase at a concentration in excess of 70 weight percent. The aforementioned alpha-alumina was present as a major phase at a content in excess of 20 weight percent. Silicon oxynitride was present as a minor phase at a concentration of between 5-10 percent. No traces of free silicon were detected in the material. No traces of silicon nitride were detected in the material.

EXAMPLE 2

2,714 grams of the heat-treated, sieved material produced in Example 1 were mixed in a one-gallon plastic bottle with 13.5 grams of oleic acid (catalog number OL 103, Spectrum Chemical Manufacturing Company, Gardena, Calif.) and 1,837 grams of 0.5 inch diameter zirconia media for 10 hours in a roller mill at a speed of 190 revolutions per minute. The mixed material was discharged from the plastic bottle and then pressed in a cylindrical die (1.125 diameter) with a Carver Laboratory Press, model number 13-872, available from the Fisher '88 Catalog (Fisher Scientific Company); a pressure of 7 tons was used. Each of the pellets so produced weighed about 10 grams.

The pellets were then debindered. They were placed into a Neytech 85N muffle furnace (available from the NEY Company, Barkmeyer Division, Yucaipa, Calif.) and heated to a temperature of 400 degrees centigrade; they were then maintained at this temperature for 2 hours.

The debindered pellets were then measured and, after being measured, were charged into the Thermal Technology, Inc. graphite furnace. The pellets were first placed onto a refractory plate made of alumina, and the plate containing the pellets was then placed into the aforementioned 2.5 inch McDanel furnace tube.

Nitrogen was flowed through the ends of the furnace tube at a rate of 4 liters per minute, and the nitrogen pressure on the pellets was 5 p.s.i.g.

The temperature was raised from ambient to 1,200 degrees centigrade at a rate of 15 degrees per minute while maintaining the same nitrogen flow rate and pressure. Thereafter, the 1,200 degree centigrade temperature was maintained for 30 minutes while the nitrogen flow was reduced to 1 liter per minute; the nitrogen pressure was increased to 15 p.s.i.g.

Thereafter, the temperature was increased to 1,650 degrees centigrade at a rate of 10 degrees per minute while the nitrogen flow rate and pressure were maintained as before.

Once the pellets reached a temperature of 1,650 degrees centigrade, they were held at this temperature for 90 minutes while the nitrogen flow rate and pressure were maintained as before.

Thereafter, the furnace was cooled to 900 degrees centigrade at a rate of 15 degrees per minute; during this cooling, the nitrogen pressure was 15 p.s.i.g., and the nitrogen flow rate was increased to 4 liters per minute.

Once the temperature had reached 900 degrees centigrade, the furnace was allowed to cool to ambient over a period of about 60 minutes; during this cooling, the nitrogen pressure was reduced to 4 p.s.i.g. and the nitrogen flow rate was maintained at 4 liters per minute.

The cooled pellets were then measured to determine their shrinkage. The difference in the maximum dimension of each pellet was used to determine shrinkage. The average linear shrinkage of was used to determine shrinkage. The average linear shrinkage of the pellets was 18 percent (in diameter) and 17 percent (in thickness). The volume shrinkage was 40 percent.

The density and water absorption of the pellets also were determined by immersing them in water and boiling them in water for one hour. The average density was 3.11 grams per cubic centimeter (which was 99.2 percent of the pellets' theoretical, calculated density); the average water absorption was 0.16 percent.

The elastic modulus of the pellets was determined in accordance with A.S.T.M. test C-848-78. The average elastic modulus of the pellets was 291 gigaPascals.

The flexural strength of the pellets was determined in accordance with A.S.T.M. test F-417-78. The average flexural strength was 486 megaPascals.

The hardness and fracture toughness of the pellets were determined by indentation. The average hardness was 14 gigaPascals. The average fracture toughness was 3.9 megaPascals per/meter$^{0.5}$.

The wear resistance of the pellets were determined by a wet test in accordance with A.S.T.M. B-611. The pellets lost about 24 cubic millimeters of material after 100 revolutions.

EXAMPLE 3

This example illustrates the preparation of a composite material which is similar to the composite material of Example 2 but in which the beta-sialon phase contains at least about 20 volume percent of beta-sialon whiskers.

A whisker is a needle-like, single crystal. The whiskers of this example have a length of from about 10 to about 100 microns, a diameter of from about 3 to about 7 microns, and an aspect ratio of from about 3 to about 20. The aspect ratio is the ratio of the length to the diameter of the whisker.

20 grams of aluminum powder (type 1401T, Aluminum Company of America), 3.0 grams of aluminum nitride (catalog number 11546, Johnson Matthey/AESAR Group, Seabrook, N.H.), 2.0 grams of sodium fluoride (catalog number 11561, Johnson Matthey . . . ), and 0.14 grams of oleic acid (catalog number OL 103, Spectrum Chemical Manufacturing Corp., Gardena, Calif.) were charged to a stainless steel vessel with a capacity of 250 cubic centimeters (part 27-17-229-6, Brinkman Instruments Company, Cantiague Road, Westbury, N.Y. 11590) along with 6 tungsten carbide balls having a total weight of 374 grams (part number 27-17-474-4, Brinkman Instruments Company). The vessel was then covered with an aluminum aeration cover (part number 27-16-219-3, Brinkman Instruments Company). This aluminum cover permits the introduction of nitrogen gas during comminution.

The covered vessel was then introduced into a centrifugal ball mill (Centrifugal Ball Mill S-1, Brinkman Instruments Company, see page 38 of the R1 catalog). The automatic rotation direction reversal mode was chosen together with the highest speed of about 540 revolutions per minute. The mixture was comminuted in this mode while under nitrogen purge for 1 hour.

The vessel was then opened, and 32 grams of silicon dioxide (catalog number 13024, Johnson Matthey) were charged into it. The continuous mode was chosen together with the highest speed of about 540 revolutions per minute. The mixture was then comminuted in this mode under nitrogen purge for 2 hours, with a 5 minute break after the first hour.

The comminuted material was discharged from the vessel, and pellets of 1.125 inch diameter were pressed in a cylindrical die with a Carver Lab Press 13-872 (see page 897 of the Fisher '88 Catalog, Fisher Scientific Company); a pressure of 3 tons was used.

The pellets, which were in contact with each other, were charged into a graphite reactor. They were ignited with a hot chromel-alumel wire, which contacted the edge of one of the pellets. Spin-combustion occurred for about for 25–30 seconds per pellet.

The combusted pellets were cooled by allowing the reactor to return to ambient temperature. The pellets were then removed from the reactor and crushed in a roll crusher until their average size was less than about 0.5 millimeters.

The crushed material was then studied under an Olympus "Zoom Stereo Microscope" (model number SZ-Tr, Olympus Optical Co., Ltd., Tokyo, Japan). Analysis revealed that the particles had a stratified structure; and long, sharp needles were found on the layer surfaces. The pellets were also subjected to scanning electron microscopic examination, energy dispersive spectrometry, and X-ray diffraction analysis. Such analyses revealed that the whiskers were single crystals consisting of beta-sialon of the formula $Si_3Al_3O_3N_5$.

The crushed material was subjected to vibratory sieving; a Tyler Portable Sieve Shaker (part number 04-909-4, Fisher '88 catalog) was used. It was first contacted with a 16 mesh sieve, and then, in turn, a 28 mesh, a 35 mesh, and a 60 mesh sieve. The material passing through the last sieve was then analyzed by X-ray diffraction techniques.

The material passing through the last sieve contained only a beta-sialon phase (of the formula $Si_3Al_3O_3N_5$), an alpha-alumina phase, and a silicon phase. Traces of aluminum nitride were present as a secondary phase. No silicon nitride phase was detected.

The beta-sialon was present in the material in a concentration in excess of 45 weight percent. The alpha alumina was present in a concentration in excess of 30 weight percent. The silicon phase was present in a concentration of about 20 weight percent.

At least about 50 volume percent of the beta-sialon material had a whisker morphology.

The material was then subjected to the heat-treatment cycle described in Example 1, and thereafter crushed, sieved, and analyzed again in the manner described above.

The material passing through the last sieve contained only a beta-sialon phase (of the formula $Si_3Al_3O_3N_5$), and an alpha-alumina phase. No aluminum nitride was detected. No silicon nitride phase was detected. Traces of silicon oxynitride were present in the material.

The beta-sialon was present in the material in a concentration in excess of 75 weight percent. The alpha alumina was present in a concentration in excess of 20 weight percent. No silicon phase was detected in the material. No silicon nitride was detected in the material.

At least about 20 volume percent of the composite material comprised beta-sialon whiskers.

EXAMPLE 4

The procedure of Example 2 was was substantially followed, with the exceptions the pellets were sintered at a final temperature at 1,620 degrees centigrade for 120 minutes, and the nitrogen flow during the entire sintering cycle was 4 liters per minute, and the nitrogen pressure during such cycle was 5 p.s.i.g.

The cooled pellets were measured and evaluated in accordance with the procedure of Example 2.

The average linear shrinkage of the pellets was 16 percent (in diameter) and 15 percent (in thickness). The volume shrinkage was 40 percent.

The density and water absorption of the pellets also were determined. The average density was 2.98 grams per cubic centimeter; the average water absorption was 0.8 percent.

The average elastic modulus of the pellets was 318 GigaPascals. The average flexural strength was 623 megaPascals. The average hardness was 16 GigaPascals. The average fracture toughness was 5.6 megaPascals per $meter^{0.5}$. The wear resistance test indicated that the pellets lost about 22 cubic millimeters of material after 100 revolutions.

EXAMPLE 5

In substantial accordance with the procedure of Example 3, 2,182 grams of aluminum powder, 327 grams of aluminum nitride, 218 grams of sodium fluoride, and 13 grams of oleic acid were charged to a Sweco "Vibro-Energy" vibratory mill (model number DM01L, available from Sweco, Inc. of Florence, Ky.) along with tungsten carbide media having a total weight of 27,530 grams. The vessel was then covered with a stainless steel cover which cover permitted the introduction of nitrogen gas during comminution. Nitrogen was flowed into the vessel at a rate of about 2 liters per minute for 30 minutes. Thereafter, the mixture was comminuted while under nitrogen purge for 6 hours.

The vessel was then opened, and 3,491 grams of silicon dioxide were charged into it. The vessel was closed again, purged with nitrogen, and the mixture was again comminuted for 12 hours under a nitrogen flow rate of 2 liters per minute.

The comminuted material was discharged from the vessel, and pellets of 2.125 inch diameter were pressed in a cylindrical die with a Carver Lab Press 13-872; a pressure of 4.5 tons was used.

The pellets, which were in contact with each other, were charged into a graphite reactor. They were ignited with a hot chromel-alumel wire, which contacted the edge of one of the pellets. Spin-combustion occurred for about for 25–30 seconds per pellet.

The combusted pellets were cooled by allowing the reactor to return to ambient temperature. The pellets were then removed from the reactor and crushed in a roll crusher until their average size was less than about 0.5 millimeters.

The crushed material was then studied under an Olympus "Zoom Stereo Microscope" (model number SZ-Tr, Olympus Optical Co., Ltd., Tokyo, Japan). Analysis revealed that the particles had a stratified structure; and long, sharp needles were found on the layer surfaces. The pellets were also subjected to scanning electron microscopic examination, energy dispersive spectrometry, and X-ray diffraction analysis. Such analyses revealed that the whiskers were single crystals consisting of beta-sialon of the formula $Si_3Al_3O_3N_5$.

The crushed material was subjected to vibratory sieving. The material passing through the sieve contained only a beta-sialon phase (of the formula $Si_3Al_3O_3N_5$), an alpha-alumina phase, and a silicon phase. Traces of aluminum nitride were present as a secondary phase. Traces of silicon oxynitride were detected. No silicon nitride phase was detected.

The beta-sialon was present in the material in a concentration in excess of 40 weight percent. The alpha alumina was present in a concentration in excess of 30 weight percent. The silicon phase was present in a concentration of about 25 weight percent.

At least about 40 volume percent of the beta-sialon material had a whisker morphology.

The material was then subjected to substantially the same heat-treatment cycle described in Example 1, with the exception that a mixture of 97.6 percent nitrogen and 2.4 percent of hydrogen (by volume) was used instead of the pure nitrogen during each of the heat treatment stages prior to raising the temperature of the material from 1,250 degrees centigrade to 1,450 degrees centigrade; the heat treated material was thereafter crushed, sieved, and analyzed again. The sieving which occured both prior to and after the heat-treatment was conducted with a Sweco vibroenergy separator, model LS-18C-33, in the manner described above.

The material passing through the last sieve contained only a beta-sialon phase (of the formula $Si_3Al_3O_3N_5$), and an alpha-alumina phase. No aluminum nitride was detected. No silicon nitride phase was detected. No traces of silicon oxynitride were present in the material.

The beta-sialon was present in the material in a concentration in excess of 75 weight percent. The alpha alumina was present in a concentration in excess of 20 weight percent. No silicon phase was detected in the material. No silicon nitride was detected in the material.

At least about 20 volume percent of the composite material comprised beta-sialon whiskers.

EXAMPLE 6

The procedure of Example 4 was substantially followed, with the exceptions that the composite material which was sintered was the composition of Example 5 and the pellets were sintered at a final temperature at 1,620 degrees centigrade for 90 minutes.

The cooled pellets were measured and evaluated in accordance with the procedure of Example 2.

The average linear shrinkage of the pellets was 17 percent (in diameter) and 17 percent (in thickness). The volume shrinkage was 40 percent.

The density and water absorption of the pellets also were determined. The average density was 3.09 grams per cubic centimeter; the average water absorption was about 0.1 percent.

The average elastic modulus of the pellets was about 300 GigaPascals. The average flexural strength was 650 megaPascals. The average hardness was 16 GigaPascals. The average fracture toughness was greater than 6.0 megaPascals per/meter$^{0.5}$. The wear resistance test indicated that the pellets lost about 24 cubic millimeters of material after 100 revolutions.

EXAMPLE 7

1,000 grams of the heat-treated and sieved material from Example 5 were charged to a 1-gallon capacity jar mill together with 3000 grams of alpha-alumina grinding media and milled for 24 hours until substantially all of the particles were smaller than 53 microns. Thereafter, 838 grams of milled material were mixed with 1,117 grams of a composite containing 35 weight percent of silicon carbide whiskers and 65 weight percent of alumina (available as the "ready-to-press blend of silicon carbide whiskers and alumina," from Benchmark Structural Ceramics Corporation of Buffalo, N.Y.).

The mixture obtained was hot-pressed at 1,650 degrees centigrade at a pressure of about 4,000 pounds per square inch. the hot-pressed body thus obtained was evaluated. It had a density of 3.24 grams per cubic centimeter, a flexural strength of 500 MegaPascals, an elastic modulus of 260 GigaPascals, a hardness of about 18 GigaPascals, and a fracture toughness of about 6.8 MegaPascals/meter$^{0.5}$.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:
1. A composite material consisting of
   (a) at least 70 weight percent of single-phase beta-sialon of the formula $Si_{6-z}Al_zO_zN_{8-z}$, wherein z is from about 2.5 to 3.5, and wherein said beta-sialon is comprised of from about 24.7 to 34.7 weight percent of silicon, from about 23.9 to 33.4 weight percent aluminum, from about 14.1 to 19.8 weight percent of oxygen, and from about 22.2 to 27.3 weight percent of nitrogen;
   (b) at least 20 weight percent of alpha-alumina;
   (c) 0 to 10 weight percent single phase silicon oxynitride;

2. The composite material as recited in claim 1, wherein at least about 20 volume percent of said single-phase beta-sialon is in the form of whiskers which have a length of from about 10 to 100 microns, a diameter of from about 3 to 7 microns, and as aspect ratio of from about 3 to 20.

3. A sintered ceramic material with a density of from about 2.94 to 3.20 grams per cubic centimeter, consisting of
   (a) at least 70 weight percent of single-phase beta-sialon of the formula $Si_{6-z}Al_zO_zN_{8-z}$, wherein z is from about 2.5 to 3.5, and wherein said beta-sialon is comprised of from about 24.7 to 34.7 weight percent of silicon, from about 23.9 to 33.4 weight percent of aluminum, from about 14.1 to 19.8 weight percent of oxygen, and from about 22.2 to 27.3 weight percent of nitrogen;
   (b) at least 20 weight percent of alpha alumina;
   (c) 0 to 20 weight percent single-phase silicon oxynitride;
   (d) said composite material:
      1. contains no silicon nitride;
      2. contains no glassy phase;
      3. has a density of from 2.94 to 3.20 grams per cubic centimeter;
      4. has an elastic modulus of from about 300 to 650 GigaPascals;
      5. has a flexural strength of from about 300 to 900 MegaPascals;
      6. has a wear resistance of from about 28 to 20 cubic millimeters per 100 revolutions; and
      7. has a porosity of less than 2 percent.

* * * * *